(12) United States Patent
Lin

(10) Patent No.: US 12,133,155 B2
(45) Date of Patent: Oct. 29, 2024

(54) ENHANCEMENTS ON USER EQUIPMENT (UE) HANDLING OF UE ROUTE SELECTION POLICY (URSP) RULES SELECTION

(71) Applicant: MEDIATEK INC., Hsinchu (TW)

(72) Inventor: Yuan-Chieh Lin, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 415 days.

(21) Appl. No.: 17/570,690

(22) Filed: Jan. 7, 2022

(65) Prior Publication Data

US 2022/0264423 A1 Aug. 18, 2022

Related U.S. Application Data

(60) Provisional application No. 63/150,161, filed on Feb. 17, 2021.

(51) Int. Cl.
*H04W 40/22* (2009.01)
*H04W 8/18* (2009.01)
*H04W 84/04* (2009.01)

(52) U.S. Cl.
CPC ........... *H04W 40/22* (2013.01); *H04W 8/183* (2013.01); *H04W 84/042* (2013.01)

(58) Field of Classification Search
CPC ..... H04W 48/18; H04W 8/183; H04W 40/22; H04W 84/042
See application file for complete search history.

(56) References Cited

U.S. PATENT DOCUMENTS

| | | | | |
|---|---|---|---|---|
| 11,057,865 | B1* | 7/2021 | Wong | H04W 68/005 |
| 11,963,134 | B2* | 4/2024 | Youn | H04W 68/12 |
| 2023/0094062 | A1* | 3/2023 | Kim | H04W 8/12 |
| | | | | 455/456.1 |
| 2023/0097726 | A1* | 3/2023 | Park | H04L 67/141 |
| | | | | 370/392 |
| 2023/0109249 | A1* | 4/2023 | Jang | H04L 67/141 |
| | | | | 709/238 |
| 2023/0164555 | A1* | 5/2023 | Starsinic | H04W 8/205 |
| | | | | 455/411 |

(Continued)

FOREIGN PATENT DOCUMENTS

EP 1 104 975 A2 * 6/2001 ............... H04Q 7/38

OTHER PUBLICATIONS

Chinese language office action dated 2022-10-27, issued in application No. TW 111105536.

(Continued)

*Primary Examiner* — Brian D Nguyen
(74) *Attorney, Agent, or Firm* — McClure, Qualey & Rodack, LLP

(57) ABSTRACT

A method for enhancing User Equipment (UE) handling of UE Route Selection Policy (URSP) rules selection is provided. A UE initiates to send a Protocol Data Unit (PDU) of an application to a mobile communication network. The UE determines that it has no URSP signaled from the mobile communication network. In response to there being pre-configured URSP rules of a Home Public Land Mobile Network (HPLMN) in a Universal Subscriber Identity Module (USIM), the UE uses only the pre-configured URSP rules of the HPLMN in the USIM to derive configuration of a PDU session via which to send the PDU of the application.

16 Claims, 4 Drawing Sheets

(56) References Cited

U.S. PATENT DOCUMENTS

2023/0292386 A1* 9/2023 Natarajan ............. H04W 60/00
2024/0080923 A1* 3/2024 Qiao ................... H04W 40/246

OTHER PUBLICATIONS

3rd Generation Partnership Project; "3GPP TS 24.526 V17.1.0; 3rd Generation Partnership Project; Technical Specification Group Core Network and Terminals; User Equipment (UE) policies for 5G System (5GS); Stage 3 (Release 17);" Dec. 2020; pp. 1-52.
3GPP TSG-CT WG6 Meeting #97; "URSP storage in USIM;" Nov. 2019; pp. 1-8.

* cited by examiner

ENHANCEMENTS ON USER EQUIPMENT (UE) HANDLING OF UE ROUTE SELECTION POLICY (URSP) RULES SELECTION

CROSS REFERENCE TO RELATED APPLICATIONS

This application claims priority under 35 U.S.C. § 119 from U.S. Provisional Application No. 63/150,161, entitled "USIM URSP rules selection", filed on Feb. 17, 2021, the subject matter of which is incorporated herein by reference.

BACKGROUND OF THE APPLICATION

Field of the Application

The application generally relates to mobile communications, and more particularly, to enhancements on User Equipment (UE) handling of UE Route Selection Policy (URSP) rules selection.

Description of the Related Art

In a typical mobile communication environment, a UE (also called a Mobile Station (MS)), such as a mobile telephone (also known as a cellular or cell phone), or a tablet Personal Computer (PC) with wireless communication capability may communicate voice and/or data signals with one or more mobile communication networks. The wireless communication between the UE and the mobile communication networks may be performed using various Radio Access Technologies (RATs), such as Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, LTE-Advanced (LTE-A) technology, etc. In particular, GSM/GPRS/EDGE technology is also called 2G technology; WCDMA/CDMA-2000/TD-SCDMA technology is also called 3G technology; and LTE/LTE-A/TD-LTE technology is also called 4G technology.

These RAT technologies have been adopted for use in various telecommunication standards to provide a common protocol that enables different wireless devices to communicate on a municipal, national, regional, and even global level. An example of an emerging telecommunication standard is the 5G New Radio (NR). The 5G NR is a set of enhancements to the LTE mobile standard promulgated by the 3rd Generation Partnership Project (3GPP). It is designed to better support mobile broadband Internet access by improving spectral efficiency, reducing costs, and improving services.

In 5G NR, a UE may be provisioned with a UE Route Selection Policy (URSP) that is a set of one or more URSP rules including information of which Protocol Data Unit (PDU) session on network slice a given service or application should use when the service or application is activated. Specifically, the URSP may be pre-configured by the Home Public Land Mobile Network (HPLMN) or a Stand-alone Non-Public Network (SNPN), or may be signaled from the HPLMN or SNPN. According to the 3rd Generation Partnership Project (3GPP) specifications and/or requirements in compliance with the 5G NR technology, a UE should use the pre-configured URSP stored in the Universal Subscriber Identity Module (USIM) if the UE has no signaled URSP. However, the pre-configured URSP in the USIM is stored per PLMN. That is, there may be one or more URSP rules of the HPLMN and one or more URSP rules of a Registered PLMN (RPLMN) in the USIM, causing indeterminate UE behaviors in URSP rules selection. Consequently, the UE may select inappropriate URSP rules and fail to derive correct configuration of the PDU session for a given service or application.

BRIEF SUMMARY OF THE APPLICATION

In order to solve the aforementioned problem, the present application proposes that the UE may only use the pre-configured URSP rules of the HPLMN and ignore the URSP rules of other PLMN(s) in the USIM if there are pre-configured URSP rules of the HPLMN in the USIM. Moreover, if there are only pre-configured URSP rules of PLMN(s) other than the HPLMN in the USIM or there is no pre-configured URSP in the USIM, then the UE may use the pre-configured URSP rules in the Mobility Equipment (ME) (if the UE has pre-configured URSP in the ME). Advantageously, the UE may select the appropriate URSP rules (i.e., the pre-configured URSP rules of the HPLMN) in the USIM, to derive correct configuration of the PDU session for a given service or application.

In one aspect of the application, a method is provided. The method comprises the following steps: initiating to send a Protocol Data Unit (PDU) of an application to a mobile communication network by a UE; determining that the UE has no URSP signaled from the mobile communication network; and in response to there being pre-configured URSP rules of a HPLMN in a USIM, using only the pre-configured URSP rules of the HPLMN in the USIM to derive configuration of a PDU session via which to send the PDU of the application.

In another aspect of the application, a UE comprising a wireless transceiver and a controller is provided. The wireless transceiver is configured to perform wireless transmission and reception to and from a mobile communication network. The controller is configured to initiate to send a PDU of an application to the mobile communication network, determine that the UE has no URSP signaled from the mobile communication network, and in response to there being pre-configured URSP rules of a HPLMN in a USIM, use only the pre-configured URSP rules of the HPLMN in the USIM to derive configuration of a PDU session via which to send the PDU of the application.

In one example, the UE ignores pre-configured URSP rules of another PLMN in the USIM. Particularly, the USIM comprises an Elementary File (EF) for storing the pre-configured URSP rules per PLMN.

In one example, in response to there being only pre-configured URSP rules of PLMNs other than the HPLMN in the USIM, the UE determines whether the UE has pre-configured URSP in a Mobile Equipment (ME). In response to the UE having pre-configured URSP in the ME, the UE uses the pre-configured URSP rules in the ME to derive the configuration of the PDU session via which to send the PDU of the application.

In one example, in response to the UE having pre-configured URSP in the ME, the UE uses the pre-configured URSP rules in the ME to derive the configuration of the PDU session via which to send the PDU of the application. In response to the UE having pre-configured URSP in the ME, the UE uses the pre-configured URSP rules in the ME to derive the configuration of the PDU session via which to send the PDU of the application.

In one example, the UE is not operating in a Stand-alone Non-Public Network (SNPN) access mode.

In one example, the determination that the UE has no URSP signaled from the mobile communication network comprises: determining that the UE does not receive a Non-Access Stratum (NAS) message comprising a URSP associated with the HPLMN from the mobile communication network.

In one example, the pre-configured URSP rules in the USIM are pre-configured by the HPLMN, and the pre-configured URSP in the ME is pre-configured by the HPLMN.

Other aspects and features of the present application will become apparent to those with ordinary skill in the art upon review of the following descriptions of specific embodiments of the methods and apparatuses for enhancing UE handling of URSP rules selection.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
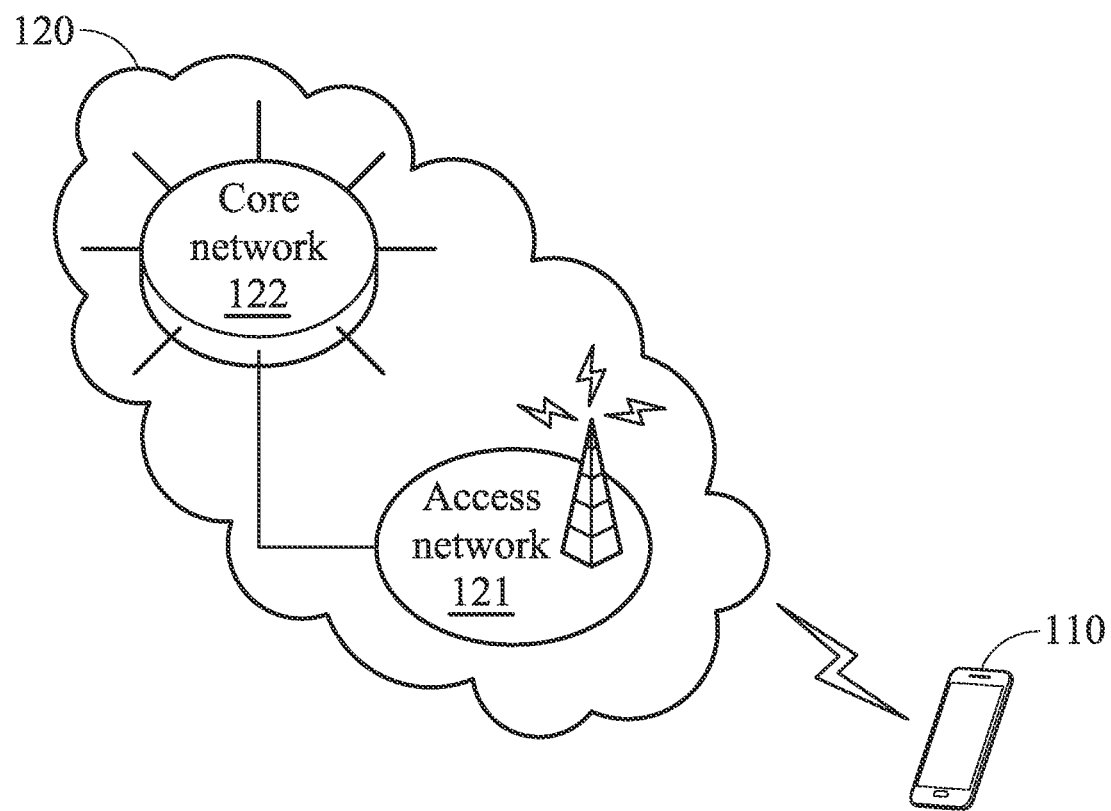
FIG. 1 is a block diagram of a mobile communication environment according to an embodiment of the application.

FIG. 1 is a block diagram of a mobile communication environment according to an embodiment of the application.

As shown in FIG. 1, the mobile communication environment 100 includes a UE 110 and a mobile communication network 120.

The UE 110 may be a feature phone, a smartphone, a panel Personal Computer (PC), a laptop computer, a Machine Type Communication (MTC) device, or any mobile communication device supporting the RAT(s) utilized by the mobile communication network 120. The UE 110 may connect to the mobile communication network 120 to obtain mobile services (e.g., voice and/or data services). As defined by the 3GPP specifications, the UE 110 may be referred to as a combination of a Mobile Equipment (ME) and a Universal Integrated Circuit Card (UICC) (e.g., a Subscriber Identity Module (SIM), or a Universal SIM (USIM), depending on the RAT in use), wherein the ME generally refers to the hardware part of the UE.

The mobile communication network 120 may include an access network 121 and a core network 122. The access network 121 is responsible for processing radio signals, terminating radio protocols, and connecting the UE 110 with the core network 122, while the core network 122 is responsible for performing mobility management, network-side authentication, and interfaces with public/external networks, such as the Internet and/or an IP Multimedia Subsystem (IMS). For example, an IMS may serve as a service delivery platform which is consisting of various network functions for providing Internet Protocol (IP) multimedia services (e.g., Voice over LTE (VoLTE)/Voice over NR (VoNR), Video over LTE (ViLTE)/Video over NR (ViNR), Short Message Service (SMS), Multimedia Messaging Service (MMS), and eXtensible Markup Language (XML) Configuration Access Protocol (XCAP), etc.) to the UE 110 over the mobile communication network 120.

In one embodiment, the mobile communication network 120 is a 5G network (e.g., an NR network), and the access network 121 and the core network 122 may be a Next Generation Radio Access Network (NG-RAN) and a 5G Core Network (5GC), respectively.

The NG-RAN may include one or more gNBs. Each gNB may further include one or more Transmission Reception Points (TRPs), and each gNB or TRP may be referred to as a 5G cellular station. Some gNB functions may be distributed across different TRPs, while others may be centralized, leaving the flexibility and scope of specific deployments to fulfill the requirements for specific cases.

The 5GC may support various network functions, including an Access and Mobility Management Function (AMF), a Session Management Function (SMF), a User Plane Function (UPF), a Policy Control Function (PCF), an Application Function (AF), and an Authentication Server Function (AUSF), wherein each network function may be implemented as a network element on dedicated hardware, or as a software instance running on dedicated hardware, or as a virtualized function instantiated on an appropriate platform, e.g., a cloud infrastructure.

The AMF provides UE-based authentication, authorization, mobility management, etc. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functions per session. The AF provides information on the packet flow to PCF responsible for policy control in order to support Quality of Service (QoS). Based on the information, the PCF determines policies about mobility and session management to make the AMF and the SMF operate properly. The AUSF stores data for authentication of UEs, while the UDM stores subscription data of UEs.

In accordance with one novel aspect, the UE 110 is capable of selecting correct URSP rules in the USIM to derive the configuration of the PDU session via which to send the PDU of the application. Specifically, when determining that the UE has no signaled URSP, the UE only uses the pre-configured URSP rules of the HPLMN and ignores the URSP rules of other PLMN(s) in the USIM if there are pre-configured URSP rules of the HPLMN in the USIM. Moreover, if there are only pre-configured URSP rules of PLMN(s) other than the HPLMN in the USIM or there is no pre-configured URSP in the USIM, then the UE 110 uses the pre-configured URSP rules in the ME (if the UE has pre-configured URSP in the ME).

Figure 2:
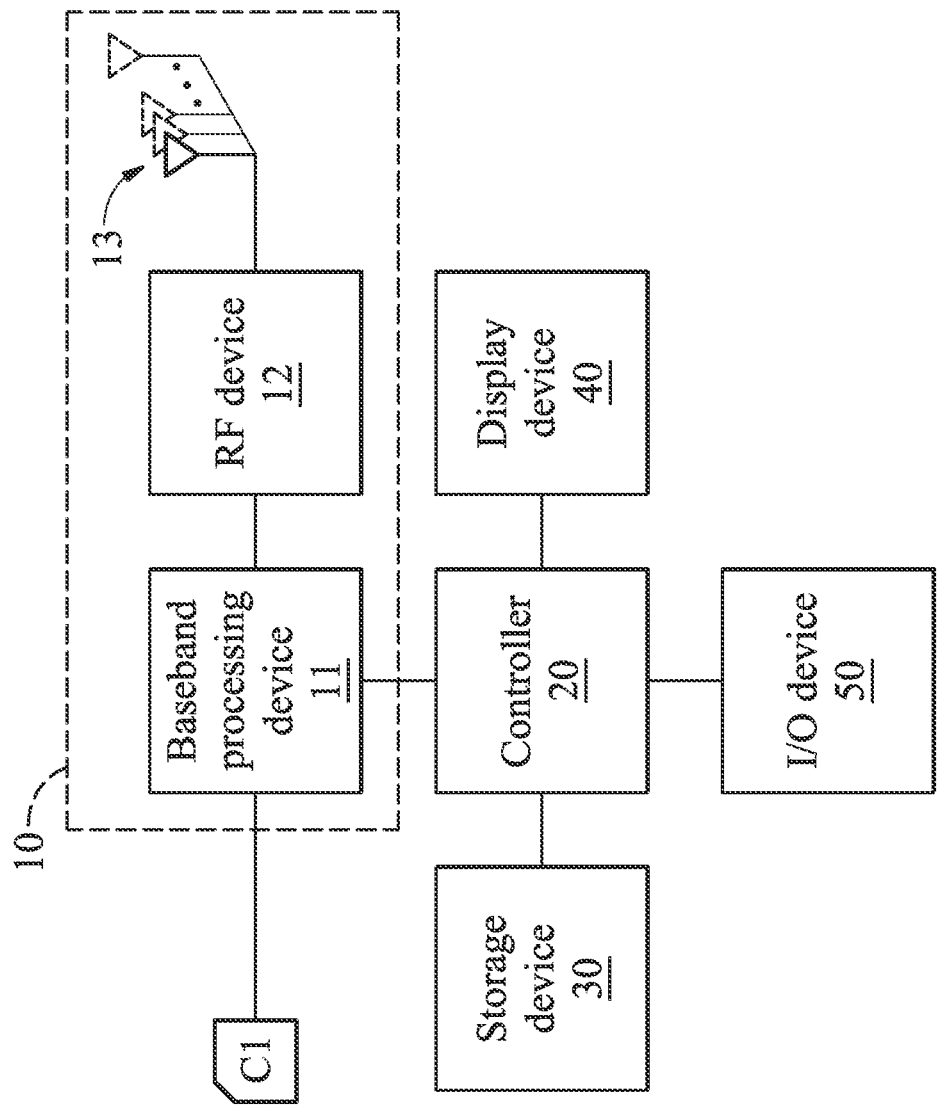
FIG. 2 is a block diagram illustrating a UE according to an embodiment of the application.

FIG. 2 is a block diagram illustrating a UE according to an embodiment of the application.

As shown in FIG. 2, a UE (e.g., the UE 110) may include a wireless transceiver 10, a controller 20, a storage device 30, a display device 40, and an Input/Output (I/O) device 50.

The wireless transceiver 10 is configured to perform wireless transmission and reception to and from the mobile communication network 120 using a UICC (denoted as C1 in FIG. 2). The UICC may be a SIM/USIM card, depending on the RAT utilized by the mobile communication network 120. Alternatively, the UICC may be a programmable SIM/USIM (e.g., eSIM/eUSIM) that is embedded directly into the UE 110. In one example, a USIM may or may not store a URSP pre-configured by the HPLMN, and the pre-configured URSP is stored per PLMN in the USIM. Specifically, the USIM may include an Elementary File (EF) (e.g., the $EF_{URSP}$ as defined in 3GPP TS 31.102) which is dedicated for storing the pre-configured URSP rules per PLMN. The exemplary format of the EF is shown below in Table 1.

TABLE 1

| Identifier: '4F0B' | Structure: BER-TLV | Optional |
|---|---|---|
| SFI: Optional | | |
| File size: >(L0 + X1 + X2 + . . . + XN + L1 + L2 + . . . + LN + 3 × N) bytes | Update activity: low | |
| Access Conditions: | | |
| | READ | PIN |
| | UPDATE | ADM |
| | DEACTIVATE | ADM |
| | ACTIVATE | ADM |
| Bytes | Description | M/O | Length |
| 1 to L0 + 1 + X1 + X2 + . . . + XN + L1 + L2 + . . . + LN + 3 × N | URSP Rules data object | O | L0 + 1 + X1 + X2 + . . . + XN + L1 + L2 + . . . + LN + 3 × N |

The URSP Rules data object may be coded as follows in table 2:

TABLE 2

| Description | Value | M/O | Length |
|---|---|---|---|
| URSP Rules data object tag | '80' | O | 1 byte |
| URSP Rules length | X1 + X2 + . . . + XN + L1 + L2 + . . . + LN + 3 × N | O | L0 bytes (note) |
| PLMN 1 | | O | 3 bytes |
| Total length of URSP rules for PLMN 1 | X1 | O | L1 bytes (note) |
| UE Route Selection Policy rules for PLMN 1 | | O | X1 bytes |
| PLMN 2 | | O | 3 bytes |
| Length of URSP rules for PLMN 2 | X2 | O | L2 bytes (note) |
| UE Route Selection Policy rules for PLMN 2 | | O | X2 bytes |
| . . . | | | |
| PLMN N | | O | 3 bytes |
| Length of URSP rules for PLMN N | XN | O | LN bytes (note) |

TABLE 2-continued

| Description | Value | M/O | Length |
|---|---|---|---|
| UE Route Selection Policy rules for PLMN N | | O | XN bytes |

Note:
The length is coded according to ISO/IEC 8825-1 [35].

In order to perform wireless transceiving, the wireless transceiver 10 may include a baseband processing device 11, a Radio Frequency (RF) device 12, and an antenna 13, wherein the antenna 13 may include an antenna array for beamforming.

The baseband processing device 11 is configured to perform baseband signal processing and control the communications between the UICC and the RF device 12. The baseband processing device 11 may contain multiple hardware components to perform the baseband signal processing, including Analog-to-Digital Conversion (ADC)/Digital-to-Analog Conversion (DAC), gain adjusting, modulation/demodulation, encoding/decoding, and so on.

The RF device 12 may receive RF wireless signals via the antenna 13, convert the received RF wireless signals to baseband signals, which are processed by the baseband processing device 11, or receive baseband signals from the baseband processing device 11 and convert the received baseband signals to RF wireless signals, which are later transmitted via the antenna 13. The RF device 12 may also contain multiple hardware devices to perform radio frequency conversion. For example, the RF device 12 may comprise a mixer to multiply the baseband signals with a carrier oscillated in the radio frequency of the supported RAT(s), wherein the radio frequency may be any radio frequency (e.g., 30 GHz-300 GHz for mmWave) utilized in the 5G NR technology, or another radio frequency, depending on the RAT in use.

The controller 20 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the functions of data processing and computing, controlling the wireless transceiver 10 to access the UICC for wireless communication with the mobile communication network 120, storing and retrieving data to and from the storage device 30, sending a series of frame data (e.g. representing text messages, graphics, images, etc.) to the display device 40, and receiving user inputs or outputting signals via the I/O device 50.

In particular, the controller 20 coordinates the aforementioned operations of the wireless transceiver 10, the storage device 30, the display device 40, and the I/O device 50 to perform the method of the present application.

In another embodiment, the controller 20 may be incorporated into the baseband processing device 11, to serve as a baseband processor.

As will be appreciated by persons skilled in the art, the circuits of the controller 20 will typically include transistors that are configured in such a way as to control the operation of the circuits in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 30 may be a non-transitory machine-readable storage medium, including a non-volatile memory, or a magnetic storage device, such as a hard disk or a magnetic tape, or an optical disc, or any combination thereof for storing data (e.g., a URSP pre-configured by the HPLMN), instructions, and/or program code of applications, communication protocols, and/or the method of the present application. If there is a pre-configured URSP stored in the storage device 30, this pre-configured URSP may be referred to as the pre-configured URSP in the ME. For example, the communication protocols may include a Session Initiation Protocol (SIP), and a 4G LTE or 5G NR protocol stack which includes a Non-Access-Stratum (NAS) layer to communicate with an AMF/SMF/MME entity connecting to the core network 122, a Radio Resource Control (RRC) layer for high layer configuration and control, a Packet Data Convergence Protocol/Radio Link Control (PDCP/RLC) layer, a Media Access Control (MAC) layer, and a Physical (PHY) layer.

The display device 40 may be a Liquid-Crystal Display (LCD), a Light-Emitting Diode (LED) display, an Organic LED (OLED) display, or an Electronic Paper Display (EPD), etc., for providing a display function. Alternatively, the display device 40 may further include one or more touch sensors disposed thereon or thereunder for sensing touches, contacts, or approximations of objects, such as fingers or styluses.

The I/O device 50 may include one or more buttons, a keyboard, a mouse, a touch pad, a video camera, a microphone, and/or a speaker, etc., to serve as the Man-Machine Interface (MMI) for interaction with users.

It should be understood that the components described in the embodiment of FIG. 2 are for illustrative purposes only and are not intended to limit the scope of the application. For example, a UE may include more components, such as a power supply, and/or a Global Positioning System (GPS) device, wherein the power supply may be a mobile/replaceable battery providing power to all the other components of the UE, and the GPS device may provide the location information of the UE for use by some location-based services or applications. Alternatively, a UE may include fewer components. For example, the UE may not include the display device 40 and/or the I/O device 50.

Figure 3:
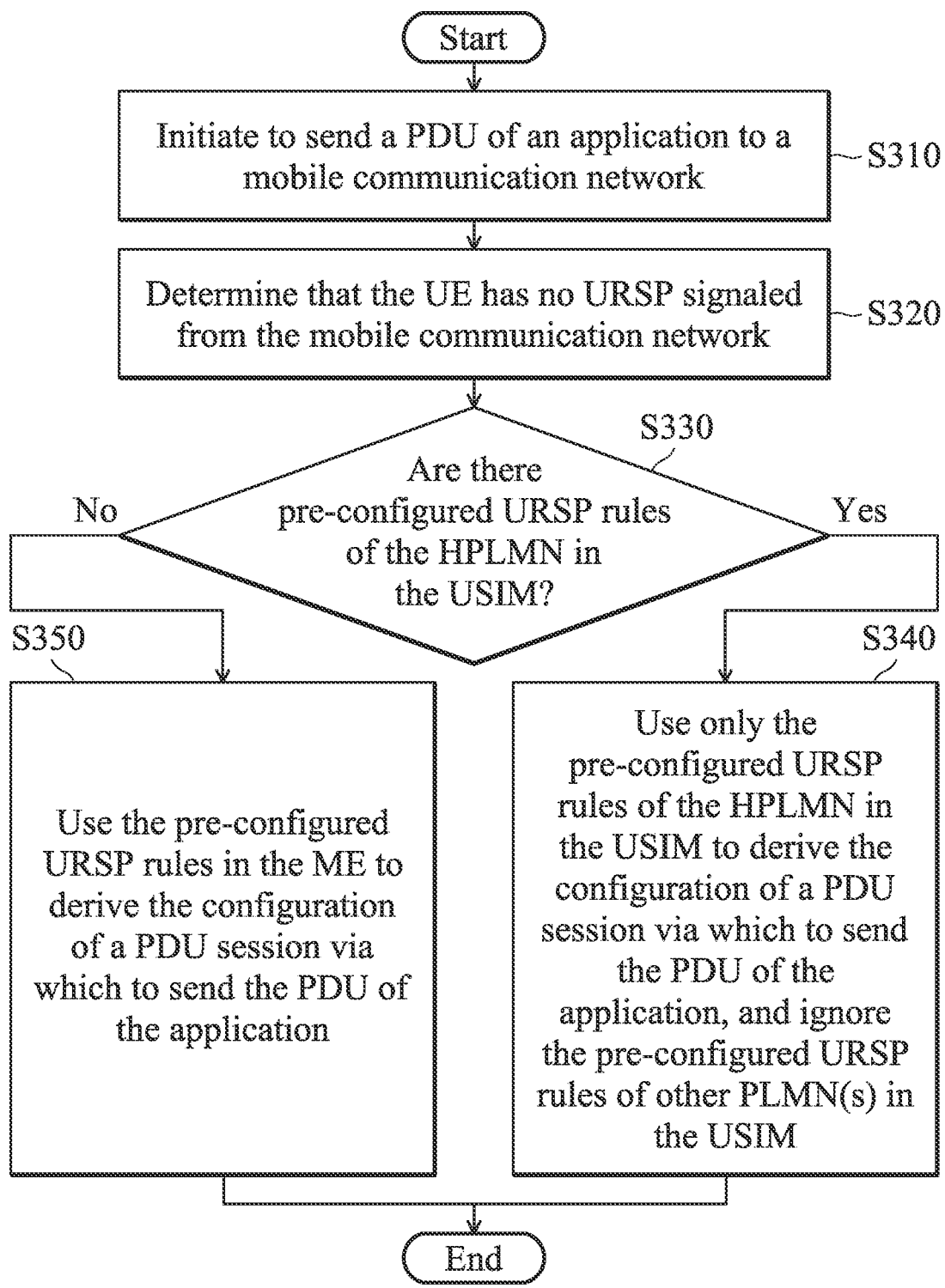
FIG. 3 is a flow chart illustrating the method for enhancing UE handling of URSP rules selection according to an embodiment of the application.

FIG. 3 is a flow chart illustrating the method for enhancing UE handling of URSP rules selection according to an embodiment of the application.

The method for enhancing UE handling of URSP rules selection may be applied to and executed by a UE (e.g., the UE 110) which is not operating in the Stand-alone Non-Public Network (SNPN) access mode (which refers to the mode of operation wherein UE only selects SNPNs).

In step S310, the UE initiate to send a PDU of an application to a mobile communication network. For example, the UE may initiate to send a PDU (e.g., IP packets) of an application in response to the application being activated (e.g., by user or by the mobile communication network).

In step S320, the UE determines that it has no URSP signaled from the mobile communication network (step S320). In one example, the mobile communication network (e.g., a PLMN or a SNPN) may provide URSP to the UE by signaling, such as a Non-Access Stratum (NAS) signaling message (e.g., a MANAGE UE POLICY COMMAND message). The UE may determine that it has no signaled URSP when it has not received any NAS signaling message including URSP associated with the HPLMN or the subscribed SNPN, wherein the NAS message may be a MANAGE UE POLICY COMMAND message.

In step S330, the UE determines whether there are pre-configured URSP rules of the HPLMN in the USIM.

Subsequent to step S330, if there are pre-configured URSP rules of the HPLMN in the USIM, the method proceeds to step S340. Otherwise, if there are only pre-configured URSP rules of PLMNs other than the HPLMN in the USIM or there is no pre-configured URSP in the USIM, the method proceeds to step S350.

In step S340, the UE uses only the pre-configured URSP rules of the HPLMN in the USIM to derive the configuration of a PDU session via which to send the PDU of the application, and ignores the pre-configured URSP rules of other PLMN(s) in the USIM.

In step S350, the UE uses the pre-configured URSP rules in the ME to derive the configuration of a PDU session via which to send the PDU of the application.

Figure 4A:
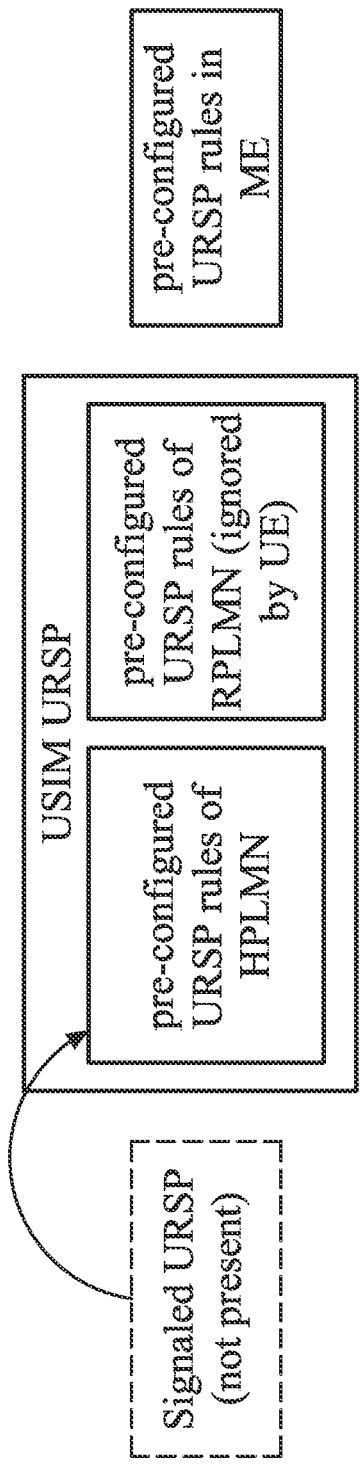
FIGS. 4A and 4B are schematic diagrams illustrating the preferred order of selecting URSP rules according to embodiments of the application.
Figure 4B:
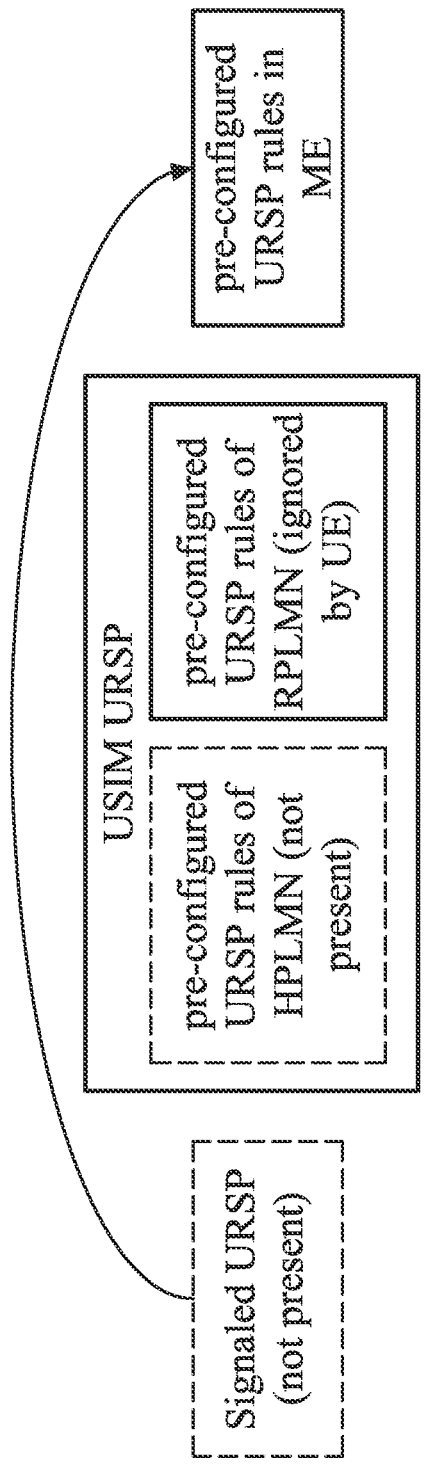

FIGS. 4A and 4B are schematic diagrams illustrating the preferred order of selecting URSP rules according to embodiments of the application.

As shown in FIG. 4A, the UE has no signaled URSP, so the UE turns to select the first preferred set of URSP rules, i.e., the pre-configured URSP rules of the HPLMN in the USIM, and ignores the pre-configured URSP rules of other PLMN(s) (e.g., RPLMN) in the USIM.

As shown in FIG. 4B, the UE has no signaled URSP and there is no pre-configured URSP rule of the HPLMN in the USIM, so the UE turns to select the second preferred set of URSP rules, i.e., the pre-configured URSP rules in the ME. Please note that even though there are pre-configured URSP rules of PLMN(s) (e.g., Registered PLMN) other than the HPLMN in the USIM, the UE ignores the pre-configured URSP rules of other PLMN(s) in the USIM and uses the pre-configured URSP rules in the ME.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

What is claimed is:

1. A method, comprising:
initiating to send a Protocol Data Unit (PDU) of an application to a mobile communication network by a User Equipment (UE);
determining that the UE has no UE Route Selection Policy (URSP) signaled from the mobile communication network;
in response to there being pre-configured URSP rules of a Home Public Land Mobile Network (HPLMN) in a Universal Subscriber Identity Module (USIM), using the pre-configured URSP rules of the HPLMN in the USIM to derive configuration of a PDU session via which to send the PDU of the application; and
in response to there being only pre-configured URSP rules of PLMNs other than the HPLMN in the USIM, determining whether the UE has pre-configured URSP in a Mobile Equipment (ME); and
in response to the UE having pre-configured URSP in the ME, using the pre-configured URSP rules in the ME to derive the configuration of the PDU session via which to send the PDU of the application.

2. The method as claimed in claim 1, further comprising: ignoring pre-configured URSP rules of another PLMN in the USIM.

3. The method as claimed in claim 1, wherein the USIM comprises an Elementary File (EF) for storing the pre-configured URSP rules per PLMN.

4. The method as claimed in claim 1, further comprising:
in response to there being no pre-configured URSP in the USIM, determining whether the UE has pre-configured URSP in a Mobile Equipment (ME); and
in response to the UE having pre-configured URSP in the ME, using the pre-configured URSP rules in the ME to derive the configuration of the PDU session via which to send the PDU of the application.

5. The method as claimed in claim 1, wherein the UE is not operating in a Stand-alone Non-Public Network (SNPN) access mode.

6. The method as claimed in claim 1, wherein the determination that the UE has no URSP signaled from the mobile communication network comprises:
determining that the UE does not receive a Non-Access Stratum (NAS) message comprising a URSP associated with the HPLMN from the mobile communication network.

7. The method as claimed in claim 1, wherein the pre-configured URSP rules in the USIM are pre-configured by the HPLMN.

8. The method as claimed in claim 1, wherein the pre-configured URSP in the ME is pre-configured by the HPLMN.

9. A User Equipment (UE), comprising:
a wireless transceiver, configured to perform wireless transmission and reception to and from a mobile communication network; and
a controller, configured to initiate to send a Protocol Data Unit (PDU) of an application to the mobile communication network, determine that the UE has no UE Route Selection Policy (URSP) signaled from the mobile communication network, and in response to there being pre-configured URSP rules of a Home Public Land Mobile Network (HPLMN) in a Universal Subscriber Identity Module (USIM), allow the UE to use the pre-configured URSP rules of the HPLMN in the USIM to derive configuration of a PDU session via which to send the PDU of the application, in response to there being only pre-configured URSP rules of PLMNs other than the HPLMN in the USIM, determine whether the UE has pre-configured URSP in a Mobile Equipment (ME), in response to the UE having pre-configured URSP in the ME, allow the UE to use the pre-configured URSP rules in the ME to derive the configuration of the PDU session via which to send the PDU of the application.

10. The UE as claimed in claim 9, wherein the controller is further configured to allow the UE to ignore pre-configured URSP rules of another PLMN in the USIM.

11. The UE as claimed in claim 9, wherein the USIM comprises an Elementary File (EF) for storing the pre-configured URSP rules per PLMN.

12. The UE as claimed in claim 9, wherein the controller is further configured to:
in response to there being no pre-configured URSP in the USIM, determine whether the UE has pre-configured URSP in a Mobile Equipment (ME); and
in response to the UE having pre-configured URSP in the ME, allow the UE to use the pre-configured URSP rules in the ME to derive the configuration of the PDU session via which to send the PDU of the application.

13. The UE as claimed in claim 9, wherein the UE is not operating in a Stand-alone Non-Public Network (SNPN) access mode.

14. The UE as claimed in claim 9, wherein the determination that the UE has no URSP signaled from the mobile communication network comprises:
determining that the UE does not receive a Non-Access Stratum (NAS) message comprising a URSP associated with the HPLMN from the mobile communication network.

15. The UE as claimed in claim 9, wherein the pre-configured URSP rules in the USIM are pre-configured by the HPLMN.

16. The UE as claimed in claim 9, wherein the pre-configured URSP in the ME is pre-configured by the HPLMN.

* * * * *